US011920976B2

(12) United States Patent
Mizzer et al.

(10) Patent No.: US 11,920,976 B2
(45) Date of Patent: Mar. 5, 2024

(54) PHOTOMETER OPTICAL COUPLING FOR A DUAL INCUBATION RING USING A PERISCOPE DESIGN

(71) Applicant: Siemens Healthcare Diagnostics Inc., Tarrytown, NY (US)

(72) Inventors: John P. Mizzer, Newark, DE (US); Donald Wood, Eklton, MD (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 7 days.

(21) Appl. No.: 17/753,302

(22) PCT Filed: Aug. 27, 2020

(86) PCT No.: PCT/US2020/048296
§ 371 (c)(1),
(2) Date: Feb. 25, 2022

(87) PCT Pub. No.: WO2021/041745
PCT Pub. Date: Mar. 4, 2021

(65) Prior Publication Data
US 2022/0221333 A1 Jul. 14, 2022

Related U.S. Application Data

(60) Provisional application No. 62/893,063, filed on Aug. 28, 2019.

(51) Int. Cl.
*G01J 1/02* (2006.01)
*G01N 35/00* (2006.01)

(52) U.S. Cl.
CPC .. *G01J 1/0271* (2013.01); *G01N 2035/00356* (2013.01); *G01N 2201/0826* (2013.01)

(58) Field of Classification Search
CPC .............. G01J 1/0271; G01J 1/00; G01N 2035/00356; G01N 2201/0826;
(Continued)

(56) References Cited

U.S. PATENT DOCUMENTS

RE31,149 E   2/1983   Ginsberg et al.
4,908,186 A   3/1990   Sakamaki
(Continued)

FOREIGN PATENT DOCUMENTS

DE   35 00 639 A1   7/1985
EP   2210039 B1     1/2016
(Continued)

OTHER PUBLICATIONS

Extended EP Search Report dated Sep. 30, 2022 of corresponding European Application No. 20858712.1, 4 Pages.
(Continued)

*Primary Examiner* — John R Lee

(57) ABSTRACT

A system for coupling photometers to an incubation ring for use in in vitro diagnostics comprises one or more light sources, and an incubation ring assembly, and two photometers. An incubation ring assembly comprises an internal trough and an external trough. Each trough comprises (a) an internal wall comprising an internal aperture and (b) an external wall comprising an external aperture. A first photometer comprises: a first optics housing directing light from the light sources through the external aperture of the internal trough, and a first detector positioned to receive the light through the internal aperture of the internal trough. A second photometer comprises a second optics housing directing the light from the light sources through the internal aperture of the external trough, and a second detector positioned to receive the light through the external aperture of the external trough.

12 Claims, 14 Drawing Sheets

(58) Field of Classification Search
CPC ........ G01N 35/02; G01N 35/00; G01N 37/00; B01L 3/50; B01L 3/502; B01L 3/508; B01L 3/5085; B01L 3/50851
See application file for complete search history.

(56) References Cited

U.S. PATENT DOCUMENTS

| | | | |
|---|---|---|---|
| 5,100,622 | A | 3/1992 | Mimura et al. |
| 5,477,326 | A | 12/1995 | Dosmann |
| 6,630,108 | B1 * | 10/2003 | Randrianarivo ..... G01N 21/253 422/65 |
| 8,675,187 | B2 * | 3/2014 | Harada ..................... G01J 3/02 356/213 |
| 2006/0008384 | A1 | 1/2006 | Devlin, Sr. et al. |
| 2011/0255090 | A1 * | 10/2011 | Harada .............. G01N 21/0332 356/432 |
| 2022/0221333 | A1 * | 7/2022 | Mizzer ................. G01J 1/0271 |

FOREIGN PATENT DOCUMENTS

| | | |
|---|---|---|
| JP | S54-142436 U | 10/1979 |
| JP | S56-034254 A | 4/1981 |
| JP | S56-060906 U | 5/1981 |
| JP | S57-147760 U | 9/1982 |
| JP | S60 42656 A | 3/1985 |
| JP | S60-146156 A | 8/1985 |
| JP | S61-013139 A | 1/1986 |
| JP | S61-029740 A | 2/1986 |
| JP | H03-088548 U | 9/1991 |
| JP | H05-031446 U | 4/1993 |
| JP | 2007-225339 A | 9/2007 |
| JP | 2010-145377 A | 7/2010 |
| WO | 2010/073604 A1 | 7/2010 |
| WO | 2010/073604 A1 | 6/2012 |
| WO | 2018/169651 A1 | 9/2018 |

OTHER PUBLICATIONS

PCT International Search Report and Written Opinion dated Jan. 19, 2021 (10 Pages).
English translation of Japanese Office Action of corresponding Japanese patent Application No. 2022-513122 17 Pages.

* cited by examiner

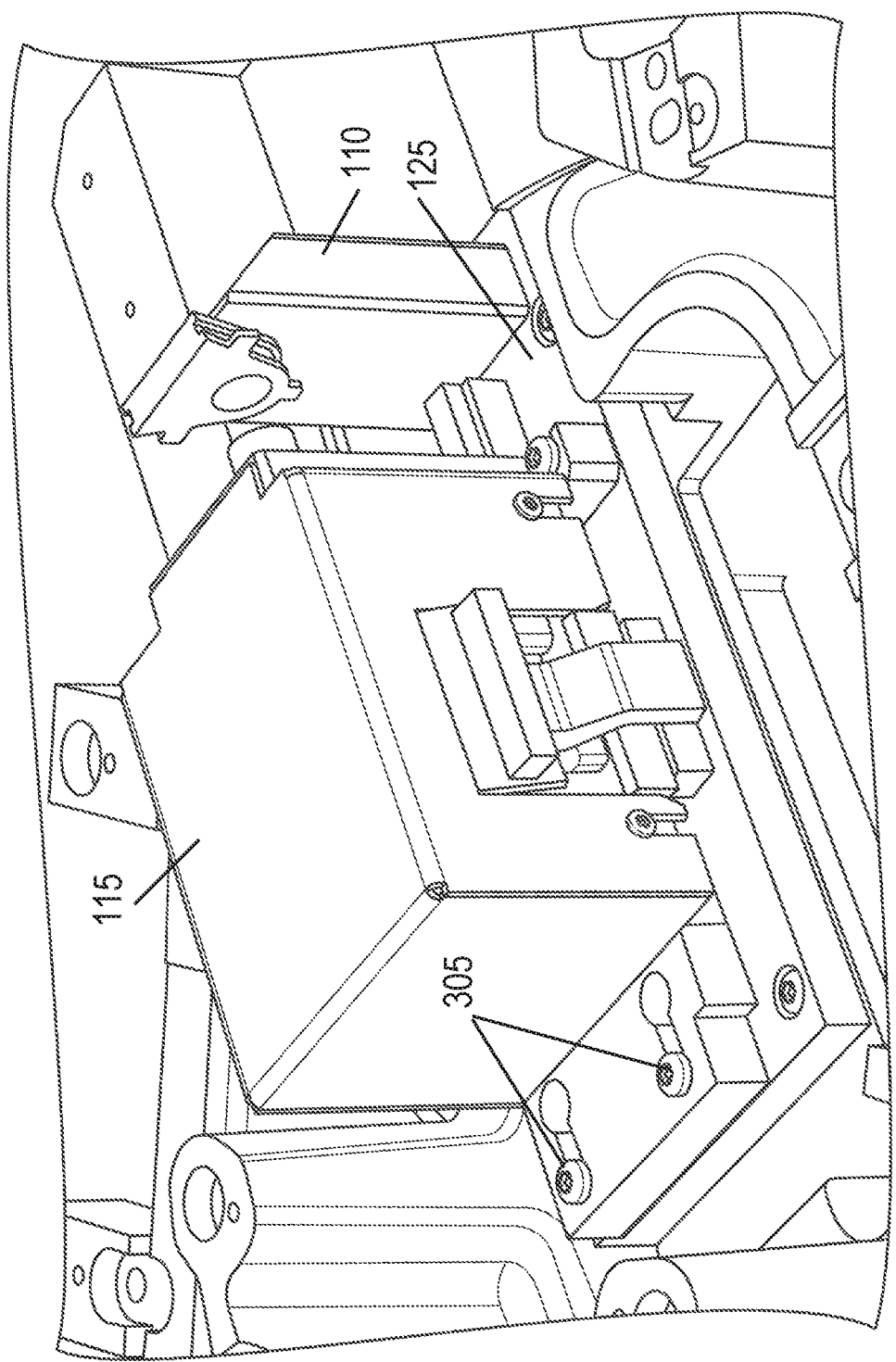

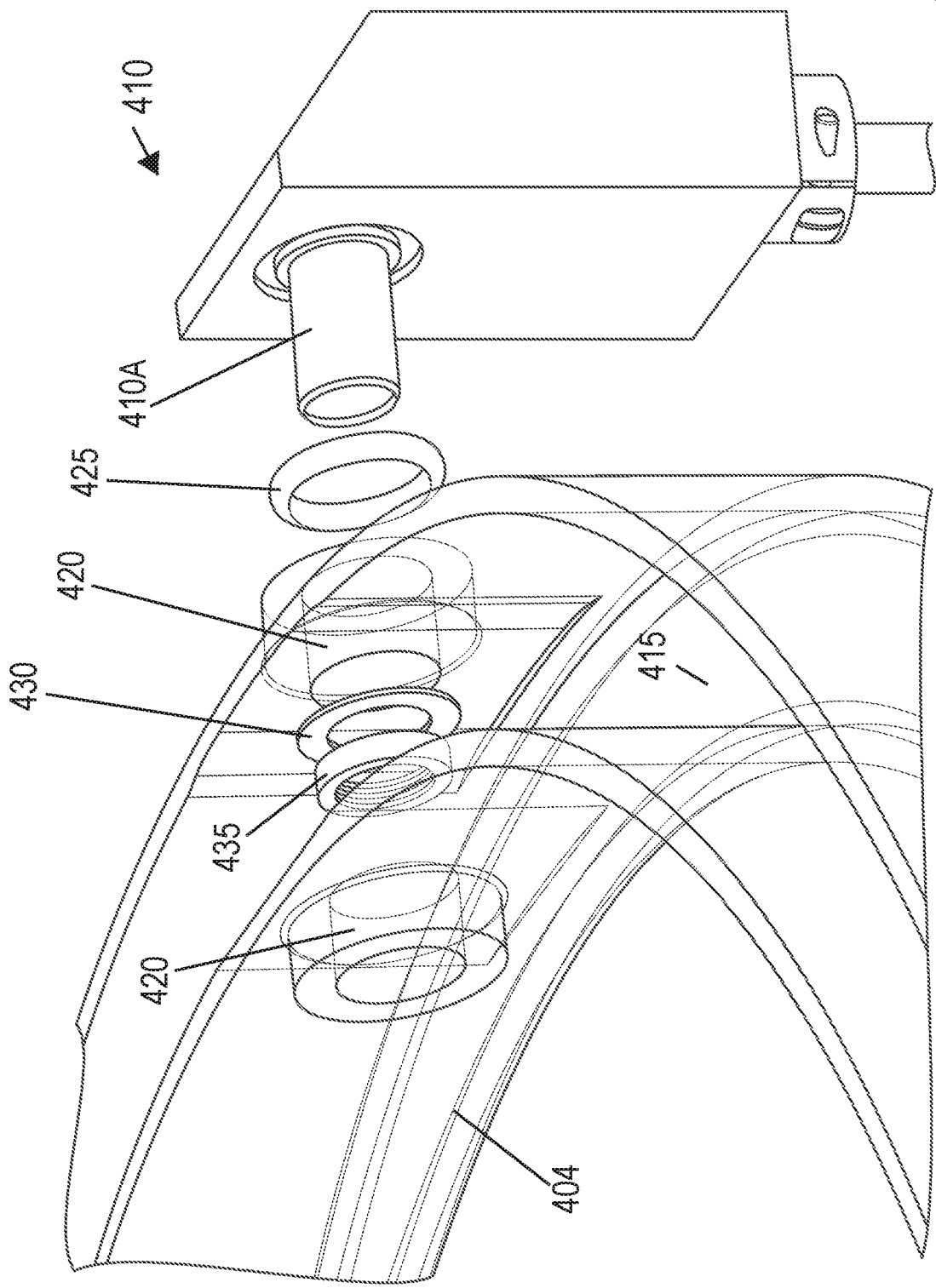

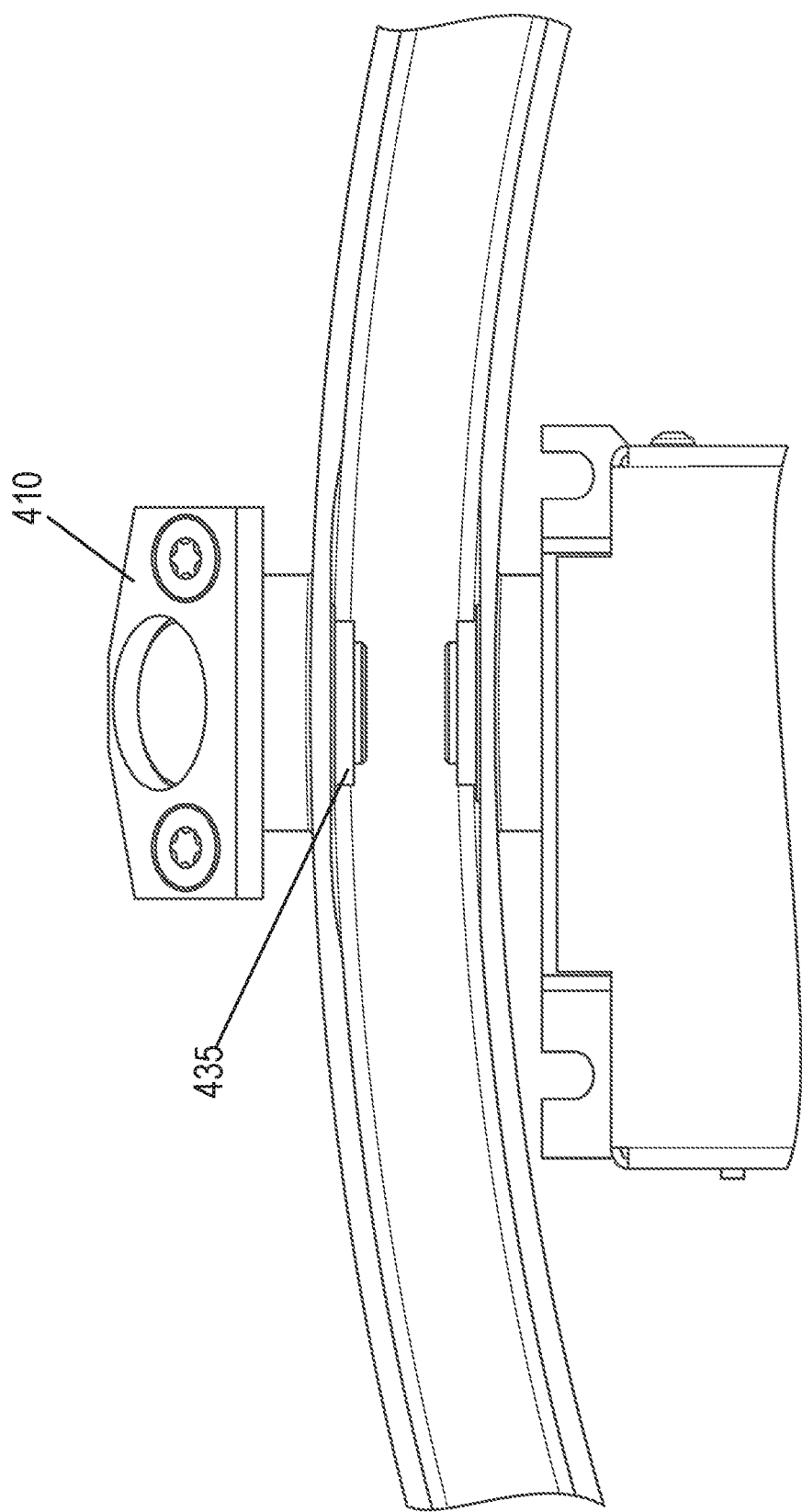

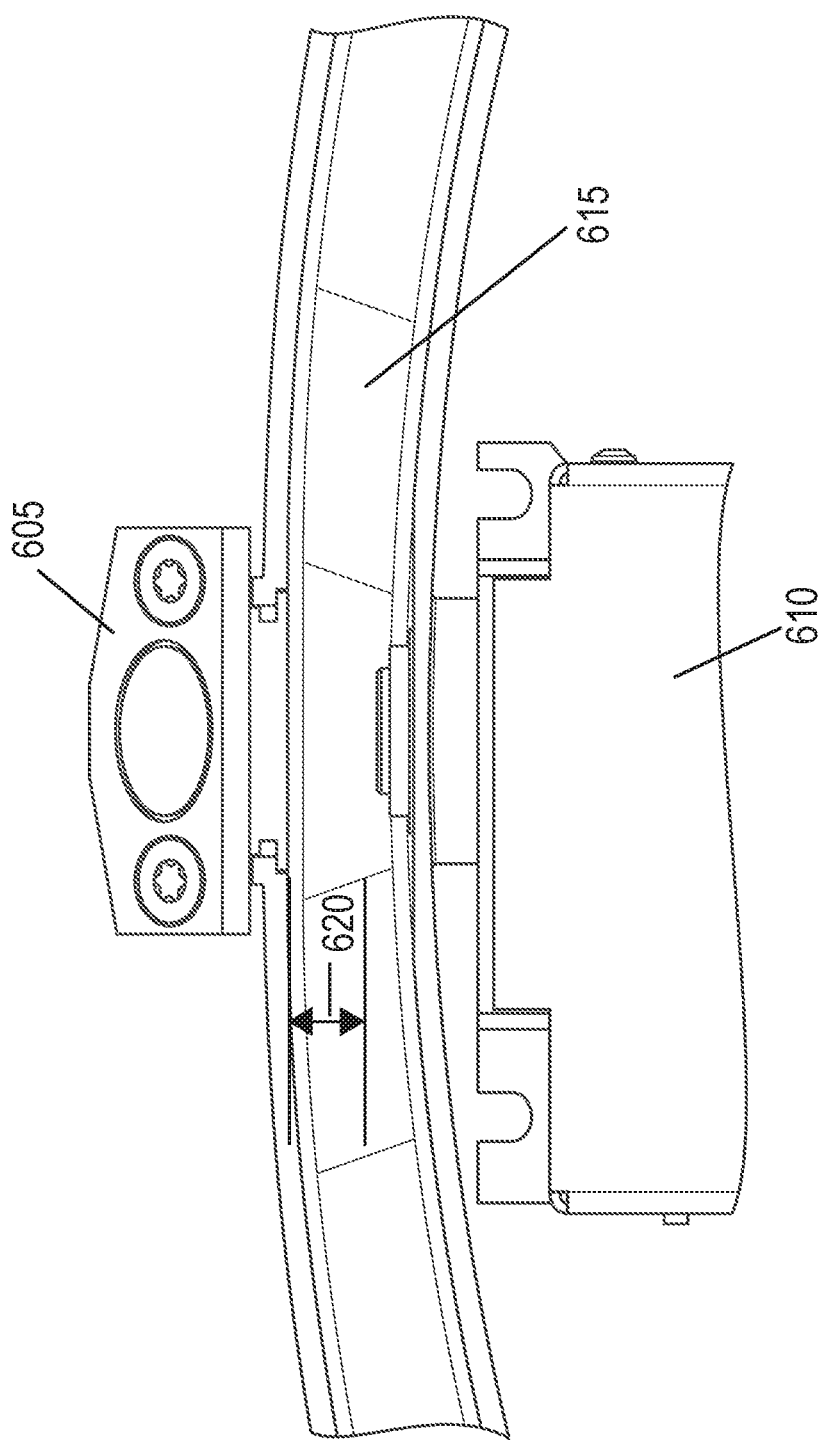

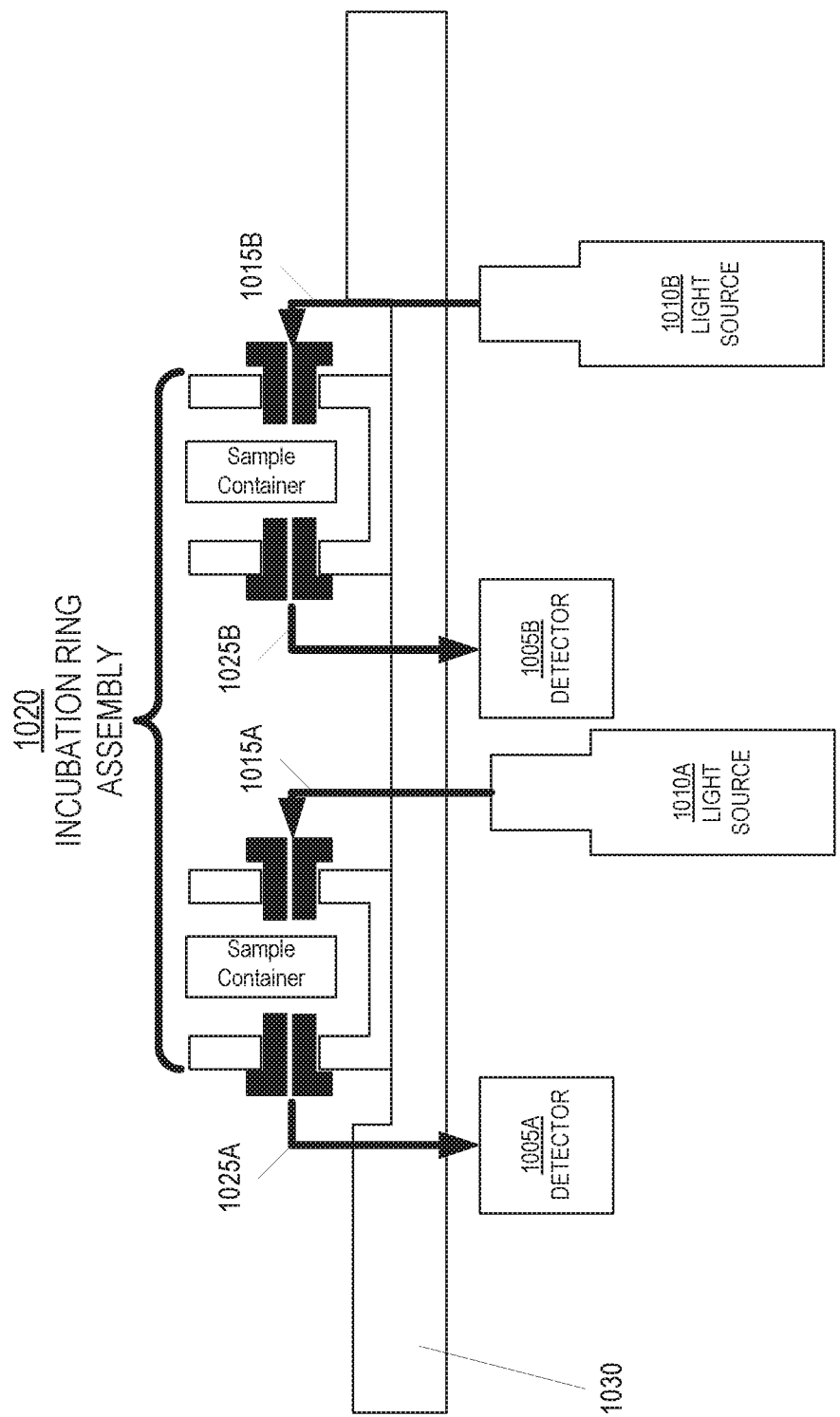

PHOTOMETER OPTICAL COUPLING FOR A DUAL INCUBATION RING USING A PERISCOPE DESIGN

CROSS-REFERENCE TO RELATED APPLICATION

This application claims the benefit of U.S. Provisional Patent Application No. 62/893,063, filed Aug. 28, 2019, which is incorporated by reference herein in its entirety.

TECHNICAL FIELD

The present invention relates generally to systems, methods, and apparatuses for coupling photometers to an incubation ring for use in automated clinical chemistry analyzers in vitro diagnostics applications.

BACKGROUND

In vitro diagnostics (IVD) allows labs to assist in the diagnosis of disease based on assays performed on patient fluid samples. IVD includes various types of analytical tests and assays related to patient diagnosis and therapy that can be performed by analysis of a liquid sample taken from a patient's bodily fluids, or abscesses. These assays are typically conducted with automated clinical chemistry analyzers (analyzers) onto which fluid containers, such as tubes or vials, containing patient samples, have been loaded. The analyzer extracts a liquid sample from the vial and combines the sample with various reagents in special reaction cuvettes or tubes (referred to, generally, as reaction vessels).

A modular approach is often used for analyzers. Some larger systems include a lab automation system that can shuttle patient samples between one sample processing module and another module. These modules include one or more stations, including sample handling stations and testing stations. Testing stations are units that specialize in certain types of assays and provide predefined testing services to samples in the analyzer. Exemplary testing stations include immunoassay (IA) and clinical chemistry (CC) stations. In some laboratories, typically including smaller labs, these testing stations can be provided as independent/standalone analyzers or testing modules, allowing an operator to manually load and unload individual samples or trays of samples for CC or IA testing at each station in the lab.

At the heart of a typical CC analyzer/module is an incubation ring assembly. To perform the above-described assays, the reactions need to take place at a well-controlled temperature range, typically coinciding with the nominal temperature of the human body samples. The incubator ring rotates relative to a fixed base, typically driven by a motor affixed to the base that drives a gear ring or belt on the moving ring. This allows assays of varying length to be performed in parallel, allowing some cuvettes to receive analytes/reagents, some receive sample aliquots, some to be analyzed, some to be washed, etc., simultaneously. One assay of particular relevance to the present application is photometric analysis. This analysis is performed using photometers coupled to the ring that pass light through sample tubes as they move on the ring.

In some systems, to regulate temperature, the base is commonly heated with a conventional heating element driven by a controller that receives thermal feedback from a temperature sensor in thermal contact with the base. The thermally controlled base heats the air gap between the base and the incubator ring, which heats the cuvette. An enclosure is provided to help insulate the entire volume of air inside. By residing in the thermally regulated air, the ring maintains the set temperature when in a steady state condition.

In other systems, to regulate temperature, the dual reaction rings are filled with water, which is heated by an enclosed heater element driven by a controller that receives thermal feedback from a temperature sensor in contact with the water. This heats the water bath to the desired reaction temperature. The reaction cuvettes are in direct contact with the water bath, and move in a constant motion to maintain the set point in a steady state condition.

Recently, a dual incubation ring design has been developed to increase the throughput of the CC modules. In contrast to a conventional single ring design, a dual incubation ring has two rings: an inner ring and a larger, outer ring. Each ring is capable of transporting samples through different assays independently. However, current dual incubation ring designs do not allow for the use of a direct optical coupling of the photometer light source, and light detector components due to space constraints.

SUMMARY

Embodiments of the present invention address and overcome one or more of the above shortcomings and drawbacks, by providing methods, systems, and apparatuses related to coupling of photometers to a dual incubation ring using a periscope design.

According to some embodiments, a system for coupling photometers to an incubation ring for use in in vitro diagnostics comprises one or more light sources, an incubation ring assembly, and two photometers. An incubation ring assembly comprises an internal trough and an external trough. Each trough comprises (a) an internal wall comprising an internal aperture and (b) an external wall comprising an external aperture. A first photometer is positioned with respect to the internal trough. This first photometer comprises: a first optics housing directing light from the light sources through the external aperture of the internal trough, and a first detector positioned to receive the light through the internal aperture of the internal trough. A second photometer is positioned with respect to the external trough. This second photometer comprises a second optics housing directing the light from the light sources through the internal aperture of the external trough, and a second detector positioned to receive the light through the external aperture of the external trough.

According to another aspect of the present invention, a photometer system comprises an optics housing and a detector. The optics housing comprises two channels and one or more reflecting surfaces. The first channel receives a fiber optic cable transmitting light from one or more light sources. The second channel is connected to the first channel at an angle. The reflecting surfaces redirect the light from the fiber optic cable to the second channel. The detector is oriented parallel with respect to the second channel of the optics housing and the detector generates a photometric measurement based on the light received from the optics housing.

In other embodiments, a method of testing a sample in an in vitro diagnostics system includes receiving a light signal from a fiber optic cable in a vertical channel of an optics housing. The light signal is directed onto a reflecting surface of the optics housing such that the light signal is reflected at an angle and through a first aperture of a trough of an incubation ring assembly. The light signal is received by a detector through a second aperture of the trough of the incubation ring assembly. Then, the light signal is processed to determine one or more photometric measurements.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures:

FIG. 3 shows an example of how screws can be used mounting the detector on the Base Plate 125, according to some embodiments;

FIG. 4 shows installation of an example optics housing on the external ring of incubation ring assembly;

FIG. 5 shows an overhead view of the fully mounted optics housing presented in FIG. 4;

FIG. 6 shows an overhead view of an example optics housing and a detector positioned on the external ring of incubation ring assembly;

FIG. 10A shows a fourth example configuration for coupling photometers to a dual incubation ring, according to some embodiments.

DETAILED DESCRIPTION

The present invention relates generally to methods, systems, and apparatuses related to the coupling of a photometer to a dual incubation ring using a periscope design. More specifically, with the designs disclosed herein, the light source (e.g., halogen, LED or hybrid) is located below the baseplate in any desired space location, and coupled by a fiber optic cable to a periscope assembly between the dual incubation rings in a minimal space. The light is focused from the fiber by a set of aspheric collimating lenses, and then turned at an angle (e.g., 45 degrees) by an optical mirror, parabolic mirror, dichroic lens, or prism to hit the target aperture for proper beam alignment to pass through the optical cuvettes to hit the detector. In some embodiments, this can be done to supply both sides of the ring using a single light source, using a bifurcated optical fiber. Likewise, in some embodiments, the general design disclosed herein may be implemented with a single light source, and single leg optical fiber.

Figure 1:
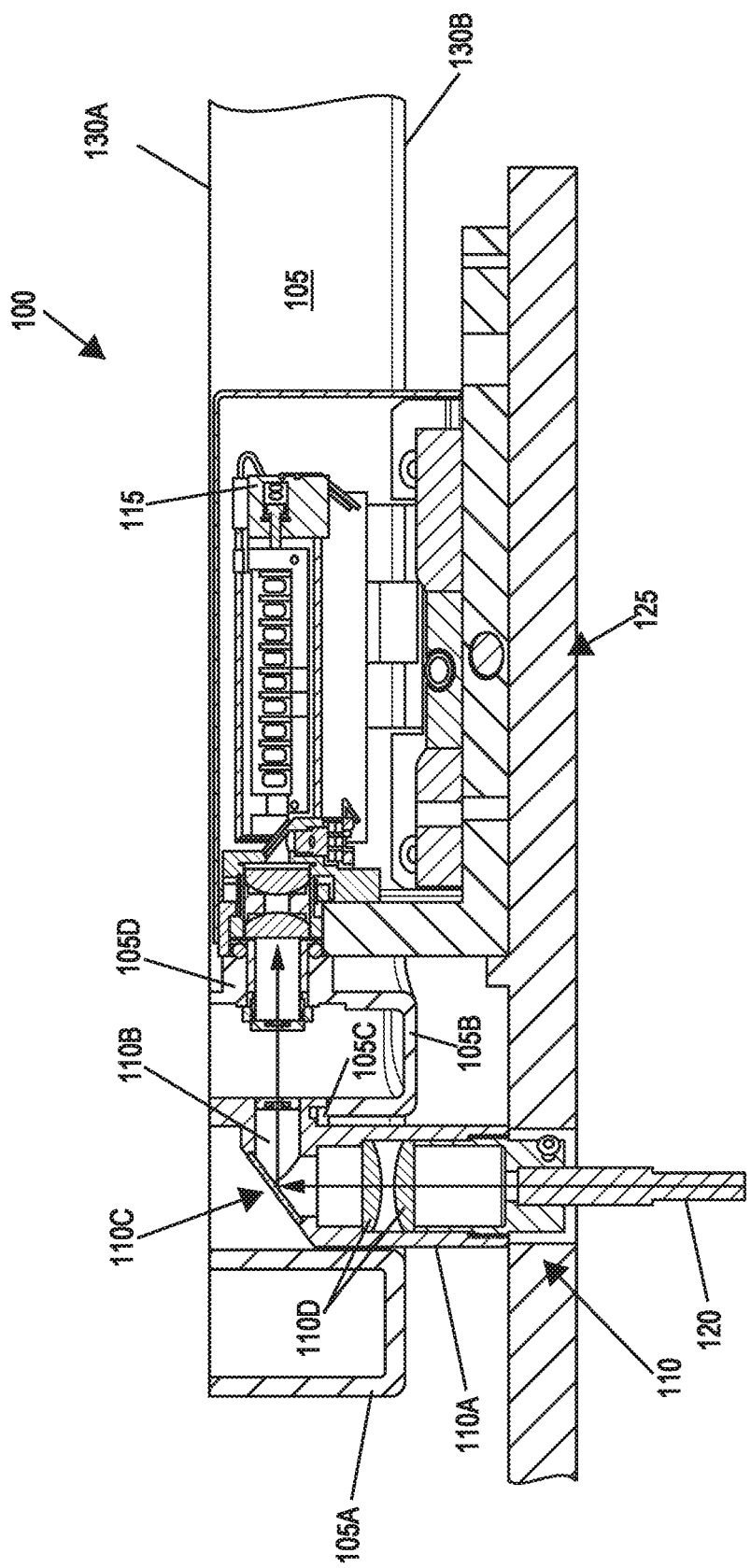
FIG. 1 illustrates system for coupling photometers to an incubation ring for use in in vitro diagnostics according to some embodiments.

FIG. 1 illustrates a system 100 for coupling photometers to an incubation ring for use in in vitro diagnostics according to some embodiments. An Incubation Ring Assembly 105 comprises an External Trough 105A and an Internal Trough 105B. Each trough comprises two apertures. For clarity, FIG. 1 only shows these apertures with respect to the Internal Trough 105B. Specifically, the Internal Trough 105B has a First Aperture 105C on the external wall (i.e., the wall farthest from the center point of the Incubation Ring Assembly 105) and a Second Aperture 105D on the internal wall (i.e., the wall closest to the center point of the Incubation Ring Assembly 105).

FIG. 1 shows a photometer assembly that comprises an Optics Housing 110 and a Detector 115. One or more light sources (not shown in FIG. 1) transmit light to the Optics Housing 110 via a Fiber Optic Cable 120. As is generally understood in the art, fiber optics allows variable length, flexible cables to transmit light over great distances. Thus, the use of fiber optics allows the light source to be located below the Incubation Ring Assembly 105 as desired to meet spacing constraints, meet manufacturability specifications, allow service access, etc.

The Optics Housing 110 is based on a "periscope" design that allows the Optics Housing 110 to fit in a minimal space location between troughs of the Incubation Ring Assembly 105. Within the Optics Housing 110, a Vertical Channel 110A receives the Fiber Optic Cable 120. Aspheric Collimating Lenses 110D focuses the light from the Fiber Optic Cable 120 on a Reflecting Surface 110C. This Reflecting Surface 110C may comprise, for example, an optical mirror, parabolic mirror, dichroic lens, or a prism. The Reflecting Surface 110C redirects the light across a Horizontal Channel 110B and through the First Aperture 105C of the Internal Trough 105B.

Continuing with reference to FIG. 1, the Detector 115 is positioned to receive the light through the Second Aperture 105D of the Internal Trough 105B. During an operation of the system 100, a vessel holding a sample moves through the Internal Trough 105B. The vessel may be transparent or include a window through which the light passes as it is transmitted from the Optics Housing 110 to the Detector 115. As would be understood by one skilled in the art of photometric measurement, one method of identifying organic and inorganic compounds in a test sample is to introduce chemical reagents that react to specific ions in the sample causing the ions to change color. When light is passed through a sample colored by a reagent, one or more colors are absorbed based on the ion present. The Detector 115 can then analyze the light that is not absorbed to infer what compounds are present in the sample.

In FIG. 1, the components of the photometer are mounted on a Base Plate 125 below the Incubation Ring Assembly 105. More specifically, the Incubation Ring Assembly 105 comprises an Upper Surface 130A defined by open sections of the External Trough 105A and the Internal Trough 105B and a Lower Surface 130B located opposite to the Upper Surface 130A. A Base Plate 125 is positioned below the Lower Surface 130B of the Incubation Ring Assembly 105. This Base Plate 125 is mounted on lower components of the analyzer system such that the Base Plate 125 rotates with the Incubation Ring Assembly 105 while sample analysis is being performed by the system. The Optics Housing 110 and the Detector 115 are then mounted to the Base Plate 125. In embodiments where a second photometer is positioned with respect to the External Trough 105A, those components can likewise be mounted on the same Base Plate 125. It should be noted that the use of single mounting baseplate for both the Optics Housing 110 and the Detector 115 allows for precise alignments, and ease of manufacturability.

Figure 2:
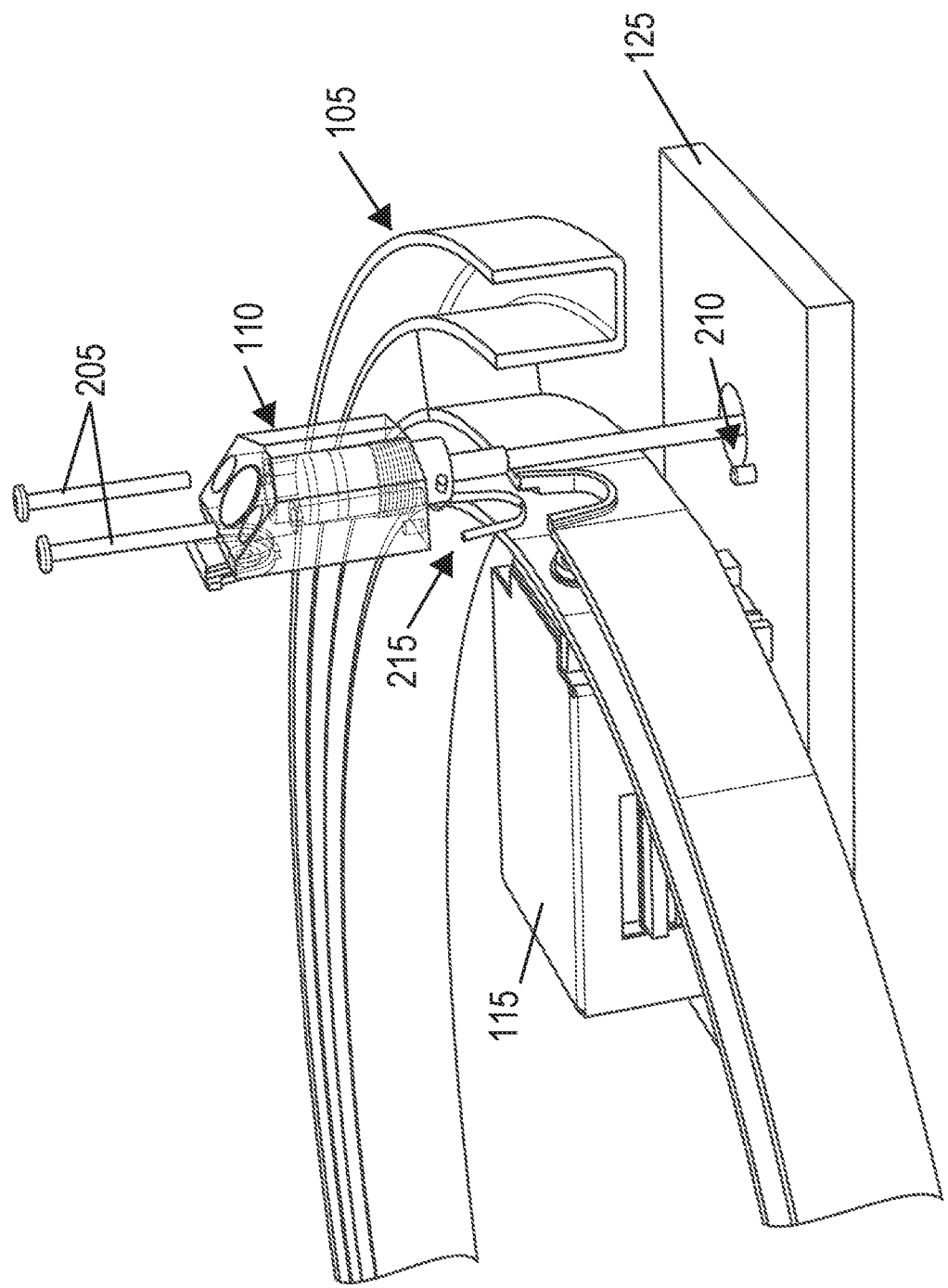
FIG. 2 provides an example of how the optics housing can be mounted on a base plate in some embodiments of the present invention.

FIG. 2 provides an example of how the Optics Housing 110 can be mounted on a Base Plate 125 in some embodiments of the present invention. A Seal 215 is used at the coupling of the Optics Housing 110 to the Incubation Ring Assembly 105 to provide a tight connection while minimizing vibrations. This Seal 215 may be, for example, a u-shaped rubber gasket. The Optics Housing 110 comprises two cavities sized to receive Pins 205. These Pins 205 are then inserted into Pin Housing 210 in the Base Plate 125 to complete the mounting. In some embodiments, the Pin Housing 210 is moveable. Thus, the position of the Optics Housing 110 may be aligned with respect to the Detector 115 and the apertures of the Incubation Ring Assembly 105. Once the components are fully aligned, the position of the Pin Housing 210 can be fixed. Then, the components can be disassembled and deployed to a clinical setting. Upon deployment, the placement of the Pin Housing 210 ensures that the aligned position of the Optics Housing 110 will be maintained. A similar procedure may be used for positioning of the Detector 115. For example, FIG. 3 shows an example of how Screws 305 can be used mounting the Detector 115 on the Base Plate 125, according to some embodiments. The general methodology illustrated in FIGS. 2 and 3 can be applied to mount additional photometers, as necessary.

FIG. 4 shows installation of an Optics Housing 410 on the external ring of Incubation Ring Assembly 404, according to some embodiments. This example, a single Trough 415 is shown for clarity; however additional troughs may be included internal to the Trough 415 in other embodiments. Furthermore, in contrast to the Incubation Ring Assembly 404, in the example of FIG. 4, the Apertures 420 are circular and a Circular Seal 425 is used when coupling the Optics Housing 410 to the Trough 415. This coupling is secured using Washer 430 and Nut 435, with the latter screwing on to threads on the Horizontal Channel 410A of the Optics Housing 410. FIG. 5 shows an overhead view of the fully mounted Optics Housing 410, with the Nut 435 fully tightened.

FIG. 6 shows an overhead view of an Optics Housing 605 and a Detector 610 positioned on the external ring of Incubation Ring Assembly 615, according to some embodiments. In this example, it is assumed that there is a specific distance (denoted by markers 620) that must be maintained between the Optics Housing 605 and the Detector 610. To support this distance, the Incubation Ring Assembly 615 narrows locally around the Optics Housing 605, thereby allowing the Optics Housing 605 to be positioned closer to the center of the ring.

Figure 7A:
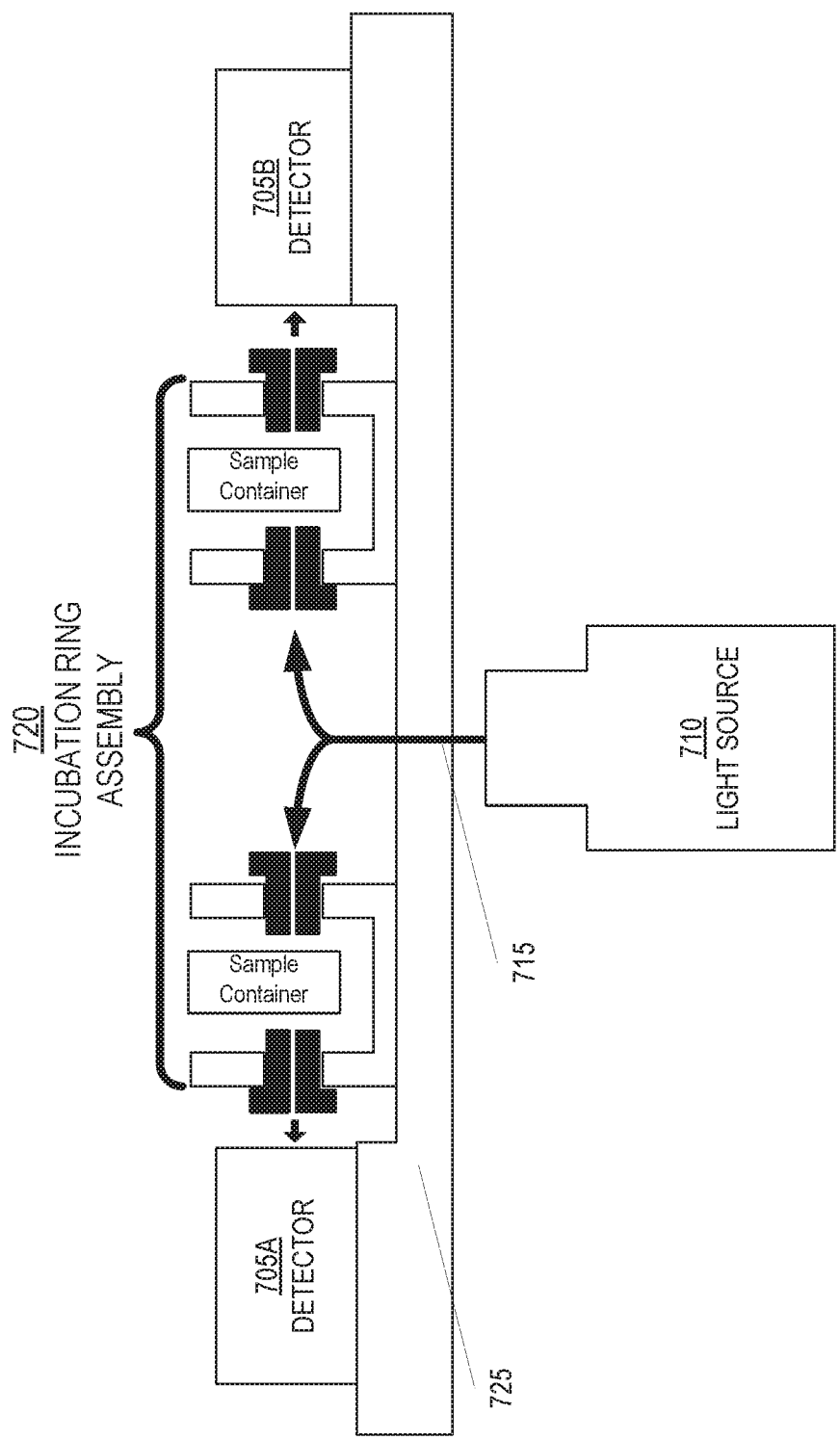
FIG. 7A shows a first example configuration for coupling photometers to a dual incubation ring, according to some embodiments.
Figure 7B:
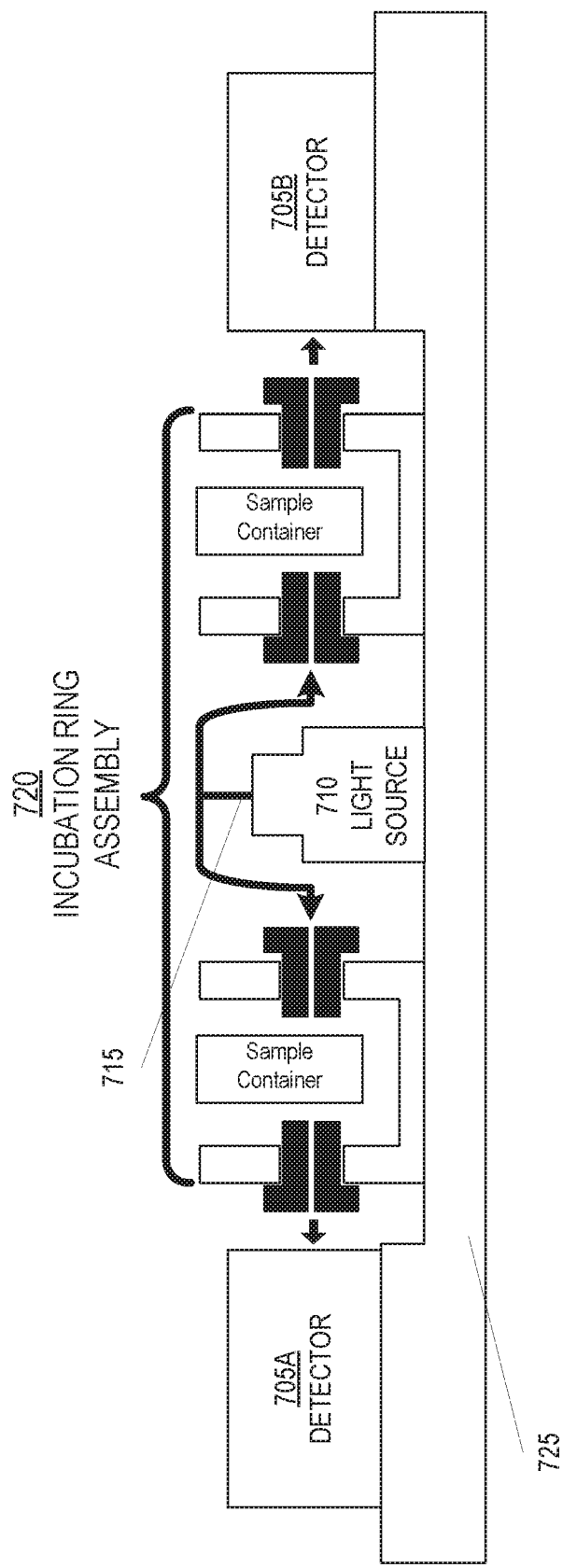
FIG. 7B shows an alternate implementation of the first example shown in FIG. 7A, with the light sources mounted above a baseplate.

FIGS. 7A-10B show example configurations for coupling photometers to a dual incubation ring assembly. In these examples, LED light sources are used. As is generally understood in the art, LED lights allow for longer life versus conventional halogen lamps which, in turn, results in less overall maintenance for the system. In FIG. 7A, two Detectors 705A, 705B are mounted co-planar with the Incubation Ring Assembly 720 on a Base Plate 725. Single LED Light Source 710 is used to provide light to the optics housings in the Incubation Ring Assembly 720. The use of a single light source may be preferable, for example, as a means of cost reduction of the overall system. A Bifurcated Fiber Bundle 715 splits the light so that it can be delivered to each individual optics housing. FIG. 7B shows an alternate implementation of the configuration presented in FIG. 7A. In the example of FIG. 7B, the Single LED Light Source 710 is installed above the Base Plate 725. The use of a fiber cable with the Bifurcated Fiber Bundle 715 allows installation of the Light Source 710 in either configuration, depending on factors such as ease of access for service.

Figure 8A:
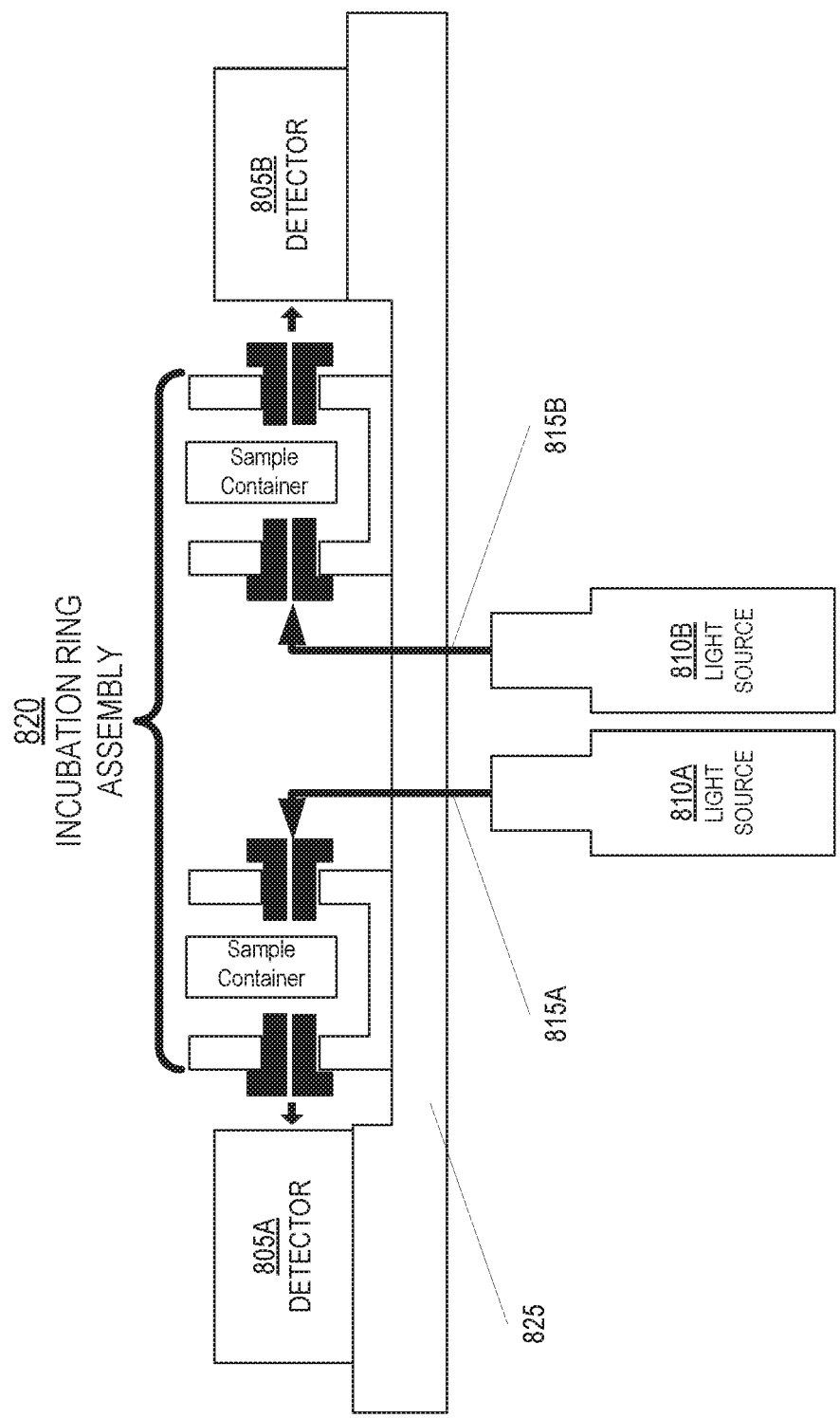
FIG. 8A shows a second example configuration for coupling photometers to a dual incubation ring, according to some embodiments.
Figure 8B:
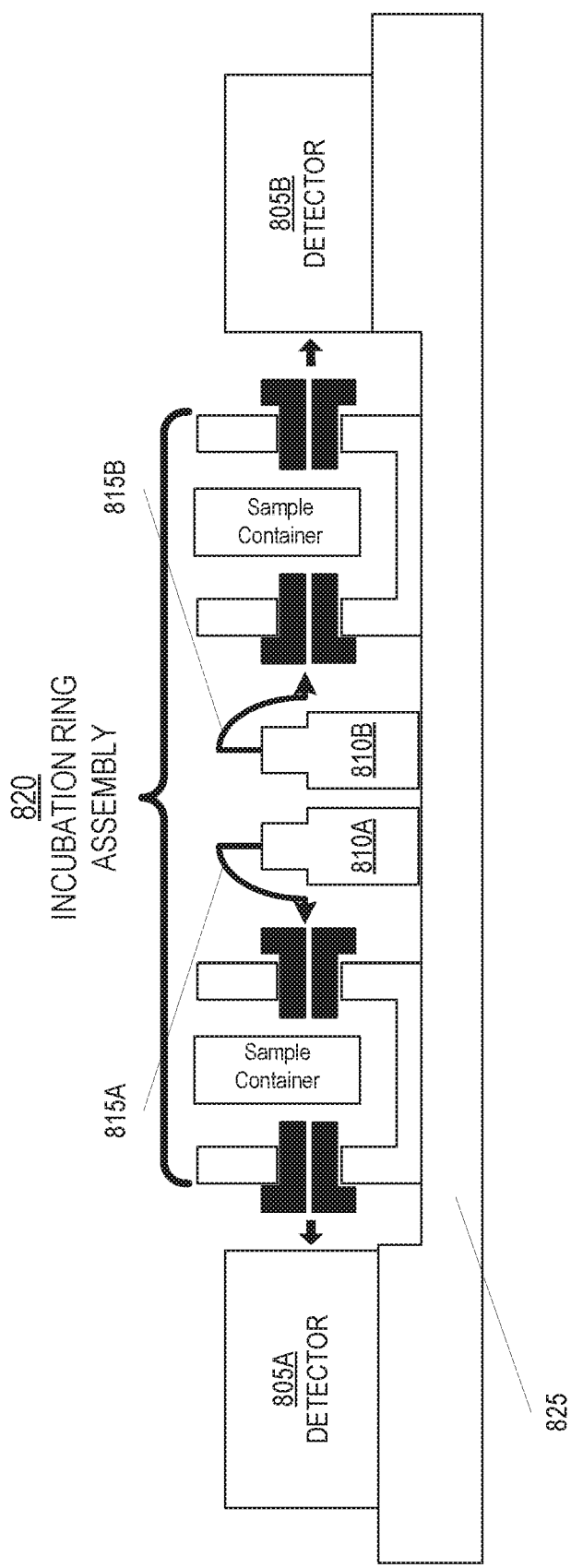
FIG. 8B shows an alternate implementation of the second example shown in FIG. 8A, with the light sources mounted above a baseplate.

FIG. 8A provides a similar configuration, with the Detectors 805A, 805B mounted co-planar with the Incubation Ring Assembly 820 on Base Plate 825. However, in contrast to FIG. 7, in FIG. 8 there are two LED Light Sources 810A and 810B connected by separate Fiber Optic Cables 815A, 815B. FIG. 8B shows an alternate version of this configuration where the LED Light Sources 810A and 810B are mounted above the Base Plate 825.

Figure 9A:
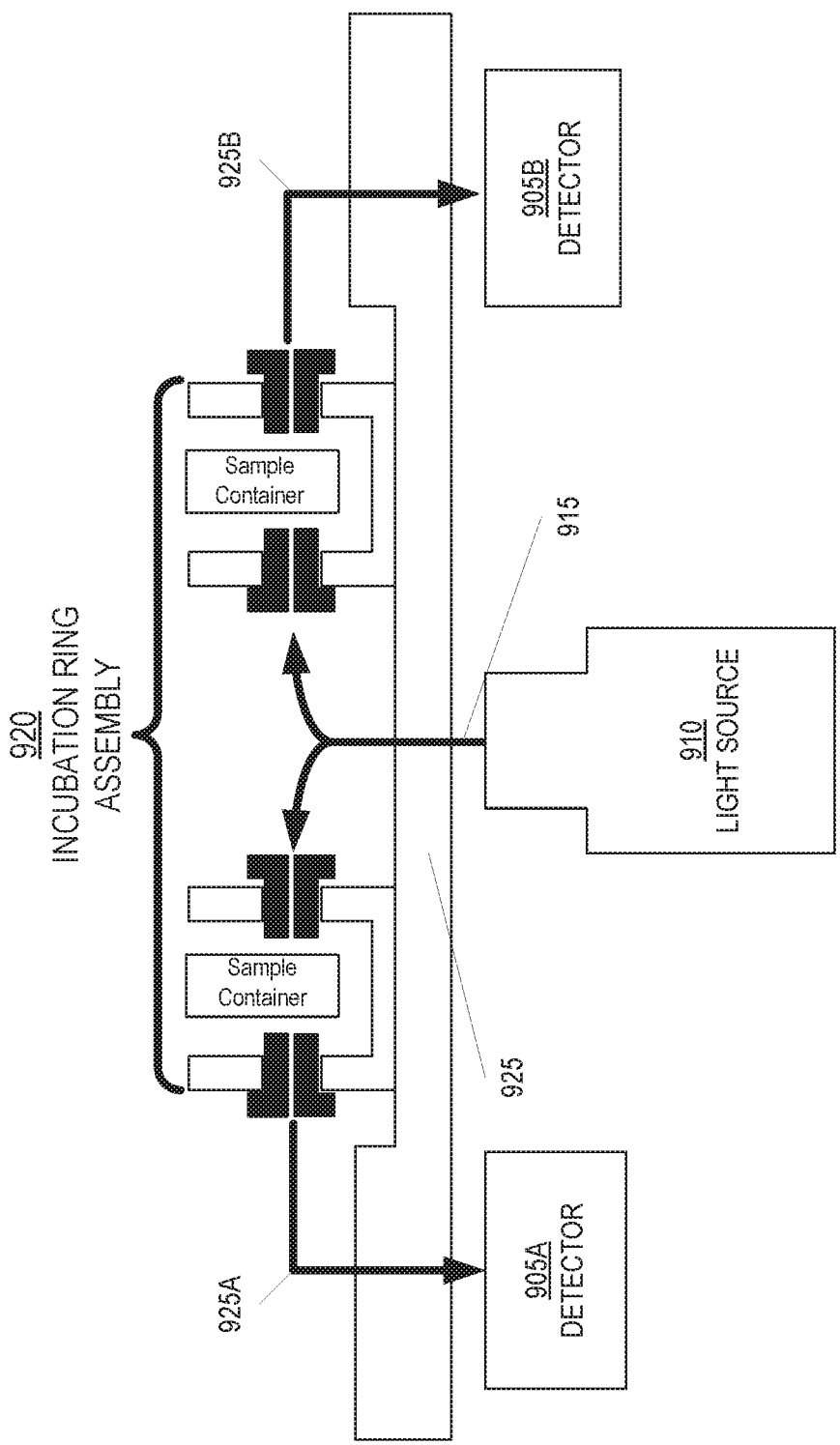
FIG. 9A shows a third example configuration for coupling photometers to a dual incubation ring, according to some embodiments.
Figure 9B:
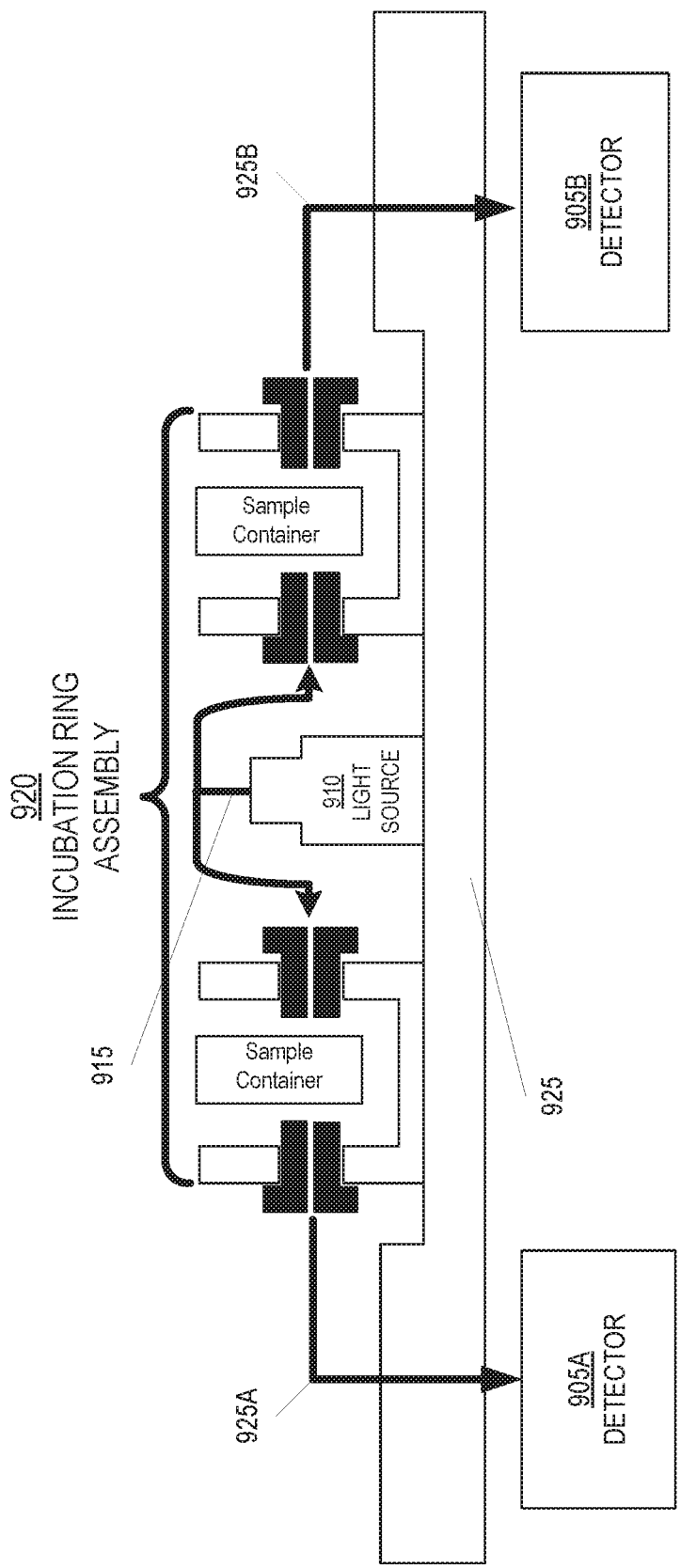
FIG. 9B shows an alternate implementation of the third example shown in FIG. 9A, with the light sources mounted above a baseplate.

FIGS. 9A, 9B, 10A, and 10B show configurations where the detectors are mounted below the incubation ring assembly. FIG. 9A is similar to FIG. 7A in that a Light Source 910 delivers light to optics housings in an Incubation Ring Assembly 920 mounted on a Base Plate 925 via a Bifurcated Fiber Bundle 915. However, in contrast to FIG. 7A, Optic Cables 925A, 925B are used to relay the captured light below the Incubation Ring Assembly 920 to Detectors 905A and 905B, respectively. FIG. 9B shows an alternate configuration where the Light Source 910 is mounted above the Base Plate 925 while the Detectors 905A and 905B are again located above the Base Plate 925.

Figure 10B:
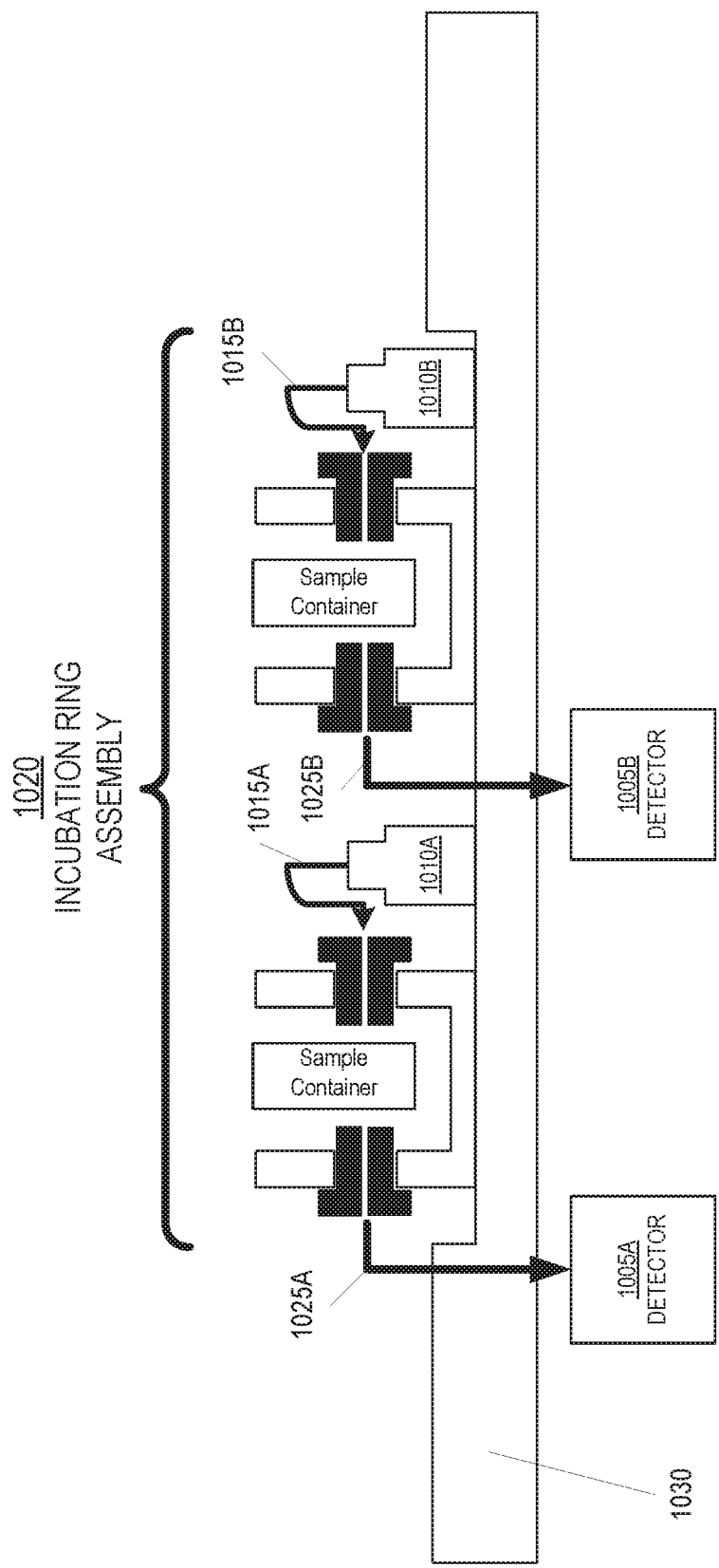
FIG. 10B shows an alternate implementation of the fourth example shown in FIG. 10A, with the light sources mounted above a baseplate.

FIG. 10A utilizes symmetrical dual LED Light Sources 1010A, 1010B connected by Fiber Optic Cables 1015A, 1015B to the optics housing in the Incubation Ring Assembly 1020 mounted on Base Plate 1030. As with the example presented in FIG. 9A, the configuration shown in FIG. 10A utilizes a second set of Fiber Optic Cables 1025A, 1025B to relay the light to Detectors 1005A, 1005B below the Incubation Ring Assembly 1020. FIG. 10B shows an alternate configuration where the LED Light Sources 1010A, 1010B are mounted above the Base Plate 1030.

The embodiments of the present disclosure may be implemented with a combination of hardware and software. In addition, functionality employed by the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

The functions and process steps herein may be performed automatically, or wholly, or partially in response to user command. An activity (including a step) performed automatically is performed in response to one or more executable instructions or device operations without user direct initiation of the activity.

The systems illustrated in the figures are not exclusive. Other systems may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers, and processes can be implemented using hardware components, software components, and/or combinations thereof. No claim element herein is to be construed under the provisions of 35 U.S.C. 112(f), unless the element is expressly recited using the phrase "means for."

We claim:

1. A system for coupling photometers to an incubation ring for use in in vitro diagnostics, the system comprising:
   one or more light sources;
   an incubation ring assembly comprising an internal trough and an external trough, wherein each trough comprises (a) an internal wall comprising an internal aperture and (b) an external wall comprising an external aperture;
   a first photometer positioned with respect to the internal trough, wherein the first photometer comprises:
      a first optics housing directing light from the light sources through the external aperture of the internal trough, and
      a first detector positioned to receive the light through the internal aperture of the internal trough; and
   a second photometer mounted positioned with respect to the external trough, wherein the second photometer comprises:
      a second optics housing directing the light from the light sources through the internal aperture of the external trough, and
      a second detector positioned to receive the light through the external aperture of the external trough.

2. The system of claim 1, further comprising:
   one or more fiber optic cables transmitting the light from the light sources to the first optics housing and the second optics housing.

3. The system of claim 1, wherein the first optics housing comprises:
   a vertical channel for receiving a fiber optic cable transmitting the light from the light sources,
   a horizontal channel connected to the external aperture of the internal trough, and
   one or more reflecting surfaces for redirecting the light from the vertical channel to the horizontal channel and through the external aperture of the internal trough.

4. The system of claim 1, wherein the second optics housing comprises:
   a vertical channel for receiving a fiber optic cable transmitting the light from the light sources,
   a horizontal channel connected to the internal aperture of the external trough, and
   one or more reflecting surfaces for redirecting the light from the vertical channel to the horizontal channel and through the internal aperture of the external trough.

5. The system of claim 1, wherein the light sources comprise (a) a first light source connected to the first optics housing via a first fiber optic cable and (b) a second light source connected to the second optics housing via a second fiber optic cable.

6. The system of claim 1, wherein the one or more light sources comprise a single light source connected to the first optics housing and the second optics housing via a second fiber optic cable via a bifurcated fiber optic cable bundle.

7. The system of claim 1, wherein the incubation ring assembly comprises an upper surface defined by open sections of the internal trough and the external trough and a lower surface located opposite to the upper surface, and the system further comprises:
   a base plate positioned below the lower surface of the incubation ring assembly,
   wherein the first photometer and the second photometer are each mounted to the base plate.

8. The system of claim 7, wherein the one or more light sources are positioned below the base plate with respect to the incubation ring assembly.

9. The system of claim 8, wherein the first detector and the second detector are each positioned below the base plate with respect to the incubation ring assembly.

10. The system of claim 7, wherein the one or more light sources are positioned above the base plate with respect to the incubation ring assembly.

11. The system of claim 10, wherein the first detector and the second detector are each positioned below the base plate with respect to the incubation ring assembly.

12. A method of testing a sample in an in vitro diagnostics system, the method comprising:
   receiving a light signal from a fiber optic cable in a vertical channel of an optics housing;
   directing the light signal onto a reflecting surface of the optics housing such that the light signal is reflected at an angle and through a first aperture of a trough of an incubation ring assembly;
   receiving the light signal by a detector through a second aperture of the trough of the incubation ring assembly;
   processing the light signal to determine one or more photometric measurements.

* * * * *